Feb. 10, 1931.  H. H. ROOT  1,791,605

RADIAL EXTRACTOR AND METHOD OF EXTRACTING HONEY

Filed Jan. 25, 1926

Inventor
Huber H. Root,
By Chas. Williamson
Attorney

Patented Feb. 10, 1931

1,791,605

UNITED STATES PATENT OFFICE

HUBER H. ROOT, OF MEDINA, OHIO, ASSIGNOR TO THE A. I. ROOT COMPANY, OF MEDINA, OHIO, A CORPORATION OF OHIO

RADIAL EXTRACTOR AND METHOD OF EXTRACTING HONEY

Application filed January 25, 1926. Serial No. 83,660.

My invention relates to centrifugal honey extractors and has for its object generally stated the provision of a construction of machine which will not require the reversal of the combs, the combs being so supported for revolution that centrifugal force will act upon honey in the cells on both sides of the mid-rib to cause the simultaneous expulsion of honey therefrom, to the end that certain inherent defects in machines acting upon this principle will be overcome and a thoroughly practical machine in the commercial sense may be provided. My invention consists in whatever is described by or is included within the terms or scope of the appended claims.

Machines in which the combs are non-reversing have heretofore been proposed which act upon the general principle above stated, but a machine embodying my invention is distinguished therefrom in that the combs in their frames are mounted in planes that are parallel with the axis of revolution of the rotating support and which extend truly radially from such axis and with the top bars of the frames outermost and a machine embodying my invention has the further distinguishing characteristic that the group of radially arranged combs is enclosed on the sides and at the bottom if desired by a strainer or sieve so that while the honey is free to pass outward therethrough, any broken pieces of comb, splinters or chips from the frames, etc., will be retained and thus stoppage of the honey outlet from obstructions such as these will be avoided.

Figure 1:
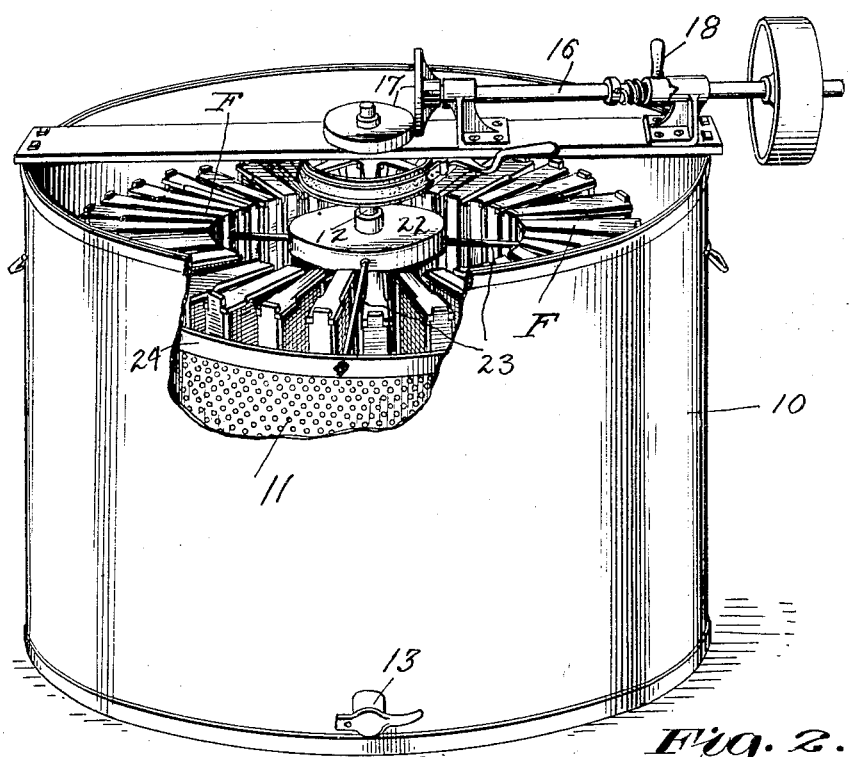
Fig. 1 is a perspective view with the cover removed of a honey extractor embodying my invention, portions being broken away.
Figure 2:
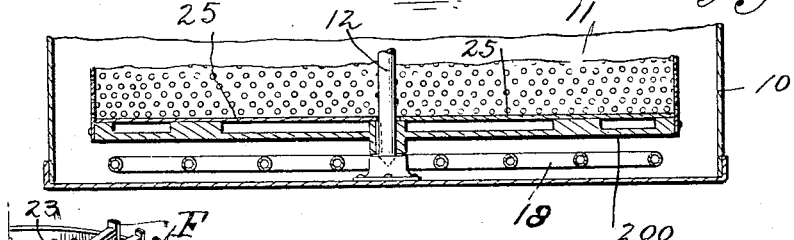
Fig. 2 is a vertical section thereof, showing the apparatus arranged for drying cappings.
Figure 3:
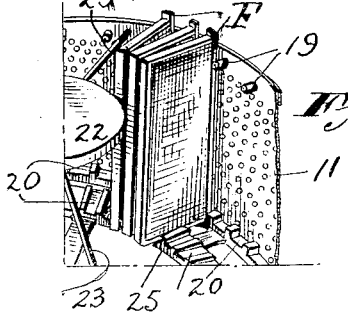
Fig. 3 is a perspective view of a portion of the apparatus showing the interior.

Referring in detail to what is shown in the drawings, within a metal can, 10, of usual construction I mount a cylindrical basket, 11, with perforated or reticulated side walls and a bottom which may be solid or perforated as desired. This basket is suitably secured to a central vertical shaft, 12, journaled in bearings at top and bottom of the can, by the revolution of which the basket may be revolved at a suitable high speed which will result in the honey within the cells of the comb mounted or supported within the basket as presently described being drawn or projected outward by centrifugal force through the perforations or openings in the side walls. The frames, F, containing the comb are supported in the basket on lines that are truly radial from the center shaft, 12, the frames being stood on end with the top bars of the frame next the side walls of the basket and the bottom bars, thus extending parallel with the shaft, 12, and the end bars of the frame being respectively at top and bottom of the basket. It will be seen that the honey may pass freely into the can at the sides but any broken comb or other débris which might clog the honey outlet, 13, of the can cannot pass into the can but is retained in the basket. Stopping up or choking of the outlet from which the honey is drawn by a pump would necessitate shutting down the operation to clear out the clogged outlet. Small particles of cappings from the honey could not possibly collect upon the walls of the basket sufficiently to clog the holes therein by reason of the centrifugal force which would drive them through the perforations. I show a power driven shaft, 16, geared by a friction drive, 17, with the upper end of the basket carrying shaft, 12, because economical operation of this type of honey extractor can only be accomplished when the apparatus is on a scale that requires power for its operation.

It will be seen that the necessary parts of apparatus embodying my invention result in apparatus of very simple construction and while the removal of honey is not as quickly done per comb as with a reversing type of extractor, that is more than off-set by the greater quantity of combs which can be placed in the machine at a time and also by the simplification of the apparatus.

It is desirable for successful operation of my radial type of extractor that the basket or comb support start at a slow speed and accelerate very slowly until a maximum speed is reached, and then for a considerable period the combs are revolved at that speed with the result that all the honey is removed from the cells. The driving mechanism shown in the drawings has the characteristic of thus revolving the basket.

The driving wheel of the friction drive, 17, is splined to the driving shaft, 16, so that it may be moved axially with said shaft by rotating a hand lever, 18, so as to vary the degree of pressure between the two wheels and thus the speed of revolution of the shaft, 12, may be varied so that the comb carrier may be started to revolve at a slow speed and the speed gradually increased, the pressure being substantially increased when about one-third or two-thirds of the honey has been expelled so that the speed much more rapidly increases until the desired maximum is reached. Other forms of variable speed gearing may be employed. For example, the driven wheel on the shaft, 12, may be mounted so as to be capable of an axial movement produced either automatically or by hand by which its point of contact with the driving wheel will shift radially, and the well known arrangement of cone pulleys may be employed.

Preferably heat is applied so that the honey will flow more freely and the application of heat to a large extent retards granulation. A steam or hot water jacket may be applied to the can, 10, or as shown in the drawings a coil of pipe, 18, may be placed in the bottom of the can, 10, through which steam or hot water from a suitable source is circulated.

The frames containing the honey may, of course, be supported in the basket in various ways. For example, the basket might have concentric rings or inner and outer circles and provided with radial notches to engage the end bars and top bars of each frame. Or as shown in the drawings, there may be spaced radial studs, 19, secured to the inside of the basket near the top to receive between them a top bar of a frame and for the lowermost end bar of each frame there may be channels, 20, extending radially, in the basket bottom, 200.

It will be observed that the combs are spaced very closely together, this being accomplished by having the radius of the circle defining or locating their inner ends approximately or substantially four-fifths of the width of the comb from top bar to bottom bar.

Experience has shown that there must be a minimum of air space between adjacent combs, because any volume of air between adjacent combs will result, when they are rotated, in the production of enough air pressure upon the combs to force them backward and crush them. By close spacing of the combs, this condition is obviated, and by "close spacing" I mean such a spacing of the combs as will diminish the air space to a point where the crushing effect of air pressure will be obviated.

I have mentioned a radius of the circle defining the inner ends of the frames as being substantially four-fifths of the width of the comb, as resulting in the important close spacing to eliminate objectionable air pressure. The matter may be put in another way. For example, frames at their inner ends or bottom bars may be placed so close together that the end bars of adjacent frames will be nearly or substantially in contact, and the outer ends or top bars spaced close enough together to make an angle small enough between adjacent combs to exclude a volume of air capable of doing damage. Of course, I do not limit myself in regard to this matter of securing the desired close spacing, because an important test is whether the spacing is such as to allow or exclude the presence of air between adjacent combs in a volume which would result in a pressure that would break down the combs.

For the support of the sieve or perforated wall at the top, a spider is preferably used comprising a disc, 22, fixed to the vertical shaft near the upper end and rods 23, that are attached to the rim of the disc and extend radially to the perforated wall and are secured thereto, a narrow band or strap, 24, being provided at the top of the perforated wall that engages it on the outer side.

This extractor may be used with great efficiency for draining cappings of honey adhering thereto. To do this it is necessary merely to place in the bottom of the basket so as to cover the radial frame supporting channels, 20, a false or removable bottom, 25. Said false bottom for convenient application and removal is made of several sections that adjoin on radial lines and when in place the false bottom extends from the center of the basket to the interior of the perforated wall. The cappings are supported upon this false bottom and by centrifugal action when the basket is revolved, the honey is drained from the cappings and strained therefrom through the perforated wall. After such a treatment, the cappings will be found dry enough to store without danger of leaking honey, because the honey is so completely removed from them. To illustrate how efficient this treatment of the cappings is, it has been found in practice that three hundred pounds of cappings may be dried in from ten to fifteen minutes.

The extractor or machine when arranged as for drying cappings may be used to extract wax from hot slumgum, that is to say, wax mixed with more or less refuse.

It will, of course, be understood by those skilled in the art that when the terms "top" and "bottom" bars are used in this specification they have reference to what are known as the top and bottom bars of the frames, and do not refer to what are actually the top and bottom bars of the frames when in the extractor and which in reality are known in the art as "end" bars.

It will also be understood that except as the terms or meaning of the claims construed by the accepted rules of interpretation restrict or limit to particular matters of construction or arrangement of parts, my protection is not to be limited to particular construction or arrangement of parts.

What I claim is:

1. A centrifugal honey extractor having a can or receptacle and a rotatable comb support within the receptacle having means to support the combs fixedly in planes radial to the axis of revolution, said rotatable support having a perforated straining wall surrounding the combs.

2. A centrifugal honey extractor having a can or receptacle and a rotatable comb support within the receptacle having means to support the combs fixedly in planes radial to the axis of revolution, said rotatable support having a perforated straining wall surrounding the combs, and having on its interior frame bar engaging means.

3. A centrifugal honey extractor having means for extracting the honey from the cells on both sides of the combs simultaneously and a rotating strainer exterior to the combs.

4. A centrifugal honey extractor comprising a can and a revolving comb carrier that supports the combs so that honey is expelled simultaneously from both sides of the combs and a strainer carried by the carrier and interposed between the combs and the can walls.

5. A centrifugal honey extractor having a can or receptacle and a rotatable comb support within the receptacle having means to support the combs in planes radial to the axis of revolution comprising a rotating basket with a vertical perforated straining wall which surrounds the combs and a bottom, said perforated wall having on its interior means to engage and position the adjacent vertically extending frame bar, and said bottom having means to engage and position the adjacent radially extending frame bar.

6. A centrifugal honey extractor having a can or receptacle and a rotatable comb support within the receptacle having means to support the combs in planes radial to the axis of revolution with the top and bottom bars of the frames parallel with the axis of revolution comprising a basket with a vertical perforated straining wall which surrounds the combs and a bottom, said perforated wall having on its interior means to engage and position the adjacent vertically extending frame bar, and said bottom having means to engage and position the adjacent radially extending frame bar.

7. A centrifugal honey extractor having a can or receptacle and a rotatable comb support within the receptacle having means to support the combs in planes radial to the axis of revolution, such means being constructed to support the combs closely spaced to prevent air pressure from crushing the combs during the revolution thereof, the comb supporting means holding the combs with their inner ends substantially in a circle having a radius substantially four-fifths of the width of the comb from top bar to bottom bar of the frame.

8. A centrifugal honey extractor having a can or receptacle and a rotatable comb support within the receptacle having means to support the combs in planes radial to the axis of revolution with the inner ends of the comb carrying frames substantially in contact, and the outer ends of such frames near enough together to exclude the presence of a volume of air between adjacent combs which would result in comb-breaking pressure during revolution thereof.

9. A centrifugal honey extractor having means for extracting the honey from the cells on both sides of the combs simultaneously, a rotating strainer exterior to the combs, and a removable bottom for the support of cappings.

10. The method of extracting honey from combs by centrifugal force which consists in rotatably supporting a number of combs so that they extend in planes from the axis of revolution outward and preventing air pressure upon the combs to a degree which will break the combs during their revolution, the ends of the combs nearest the axis of revolution being maintained in a circle of a radius substantially four-fifths of the distance from such ends to their ends farthest from the axis of revolution.

11. A centrifugal extractor for bee products comprising a container for the products to be treated, having a perforated straining wall against which the material is projected by centrifugal force when the container is revolved, and means for rotating such container at high speed.

12. A centrifugal extractor for bee products comprising a container for the products to be treated, having a perforated straining wall against which the material is projected by centrifugal force when the container is revolved, and means for rotating such container at high speed, said container having a removable bottom.

13. A centrifugal honey extractor having a can or receptacle and a rotatable comb support within the receptacle having means to support the combs in planes radial to the axis of revolution with the inner ends of the comb carrying frames substantially in contact and the outer ends of such frames near enough together to exclude the presence of a volume of air between adjacent combs which would result in comb-breaking pressure during revolution thereof, and a rotating strainer exterior to the combs.

In testimony whereof I hereunto affix my signature.

HUBER H. ROOT.